(12) United States Patent
Kowada

(10) Patent No.: US 8,397,492 B2
(45) Date of Patent: Mar. 19, 2013

(54) EXHAUST EMISSION CONTROL DEVICE

(75) Inventor: Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 326 days.

(21) Appl. No.: 12/994,381

(22) PCT Filed: May 27, 2008

(86) PCT No.: PCT/JP2008/001315
§ 371 (c)(1),
(2), (4) Date: Nov. 23, 2010

(87) PCT Pub. No.: WO2009/144766
PCT Pub. Date: Dec. 3, 2009

(65) Prior Publication Data
US 2011/0088376 A1 Apr. 21, 2011

(51) Int. Cl.
*F01N 3/24* (2006.01)
(52) U.S. Cl. .................. 60/295; 60/297; 60/317
(58) Field of Classification Search ........... 60/297, 60/324, 295, 301, 303, 311, 317, 299; 95/96
See application file for complete search history.

(56) References Cited

U.S. PATENT DOCUMENTS

| | | | |
|---|---|---|---|
| 6,419,843 | B1 | 7/2002 | Natarius |
| 7,712,305 | B2 * | 5/2010 | Kapsos et al. ........... 60/286 |
| 2002/0053287 | A1 | 5/2002 | Natarius |
| 2003/0110763 | A1 | 6/2003 | Pawson et al. |
| 2006/0153748 | A1 * | 7/2006 | Huthwohl et al. ....... 422/172 |
| 2007/0101703 | A1 | 5/2007 | Kanaya et al. |
| 2007/0137188 | A1 * | 6/2007 | Ohya et al. ............... 60/311 |

(Continued)

FOREIGN PATENT DOCUMENTS

| | | |
|---|---|---|
| EP | 1 262 644 A2 | 12/2002 |
| GB | 2 217 619 A | 11/1989 |

(Continued)

OTHER PUBLICATIONS

Supplementary European Search Report issued Feb. 6, 2012, in Patent Application No. EP 08 76 3915.

(Continued)

*Primary Examiner* — Thomas Denion
*Assistant Examiner* — Todd Pleiness
(74) *Attorney, Agent, or Firm* — Oblon, Spivak, McClelland, Maier & Neustadt, L.L.P.

(57) ABSTRACT

An object of the invention is to provide an exhaust emission control device capable of favorably dispersing urea water for improved mixing with exhaust gas even if a flow rate of the exhaust gas is increased. An entry end of a mixing pipe is formed with a first opening at a position near an exit side of a particulate filter and is formed with a second opening at a position away from the exit side of the particulate filter and diametrically opposite to the first opening. Arranged in a downstream end of a gas gathering chamber are a first partition which guides all of the flow of exhaust gas from the particulate filter into a one-way swirling flow around the entry end of the mixing pipe, a second partition which divides the flow of the exhaust gas guided by the first partition into two to cause an inner one of the divided swirling flows to tangentially enter into the first opening and a third partition which causes the remaining outer swirling flow to tangentially enter into the second opening.

2 Claims, 4 Drawing Sheets

U.S. PATENT DOCUMENTS

| | | |
|---|---|---|
| 2008/0264048 A1 | 10/2008 | Nishiyama et al. |
| 2009/0313979 A1 | 12/2009 | Kowada |
| 2010/0257849 A1 | 10/2010 | Kowada |
| 2010/0257850 A1 | 10/2010 | Kowada et al. |

FOREIGN PATENT DOCUMENTS

| | | |
|---|---|---|
| GB | 2 434 557 A | 8/2007 |
| JP | 2004 108221 | 4/2004 |
| JP | 2005 155404 | 6/2005 |
| JP | 2006 29233 | 2/2006 |
| JP | 2007 29923 | 2/2007 |
| JP | 2007 40149 | 2/2007 |
| JP | 2007 40224 | 2/2007 |

OTHER PUBLICATIONS

International Search Report issued Sep. 2, 2008 in PCT/JP08/01315 filed May 27, 2008.

* cited by examiner

EXHAUST EMISSION CONTROL DEVICE

TECHNICAL FIELD

The present invention relates to an exhaust emission control device.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the selective reduction catalyst and the particulate filter, thereby attaining lessening of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a urea water added position and the selective reduction catalyst. However, arrangement of the particulate filter and the selective reduction catalyst substantially spaced apart from each other will extremely impair the mountability on a vehicle.

In order to overcome this, a compact exhaust emission control device as shown in FIGS. 1 and 2 has been proposed by the inventor as Japanese patent application No. 2007-29923. In the exhaust emission control device of the prior application shown, incorporated in an exhaust pipe 4 through which exhaust gas 3 flows from a diesel engine 1 via an exhaust manifold 2 is a particulate filter 5 housed in a casing 7 to capture particles in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. An exit end of the particulate filter 5 is connected to an entry end of the selective reduction catalyst 6 through an S-shaped communication passage 9 such that the exhaust gas 3 discharged through the exit end of the particulate filter 5 is reversely curved back into the entry end of the adjacent selective reduction catalyst 6.

As shown in FIG. 2 which shows substantial parts in enlarged scale, the communication passage 9 is the S-shaped structure comprising a gas gathering chamber 9A which encircles the exit end of the particulate filter 5 to gather the exhaust gas 3 just discharged from the exit end of the particulate filter 5 through substantially perpendicular turnabout of the gas, a mixing pipe 9B which extracts the gathered exhaust gas 3 from the chamber 9A in a direction reverse to the flow of the exhaust in the particulate filter 5 and which is provided with a urea water addition injector 11 (urea water addition means) intermediately of the mixing pipe and a gas dispersing chamber 9C which encircles the entry end of the selective reduction catalyst 6 so as to disperse the gas 3 guided by the mixing pipe 9B through substantially perpendicular turnabout of the gas into the entry end of the selective reduction catalyst 6.

Arranged in the casing 7 and in front of the particulate filter 5 is an oxidation catalyst 14 for oxidization treatment of unburned fuel in the exhaust gas 3, and arranged in the casing 8 and behind the selective reduction catalyst 6 is an ammonia lessening catalyst 15 for oxidization treatment of surplus ammonia.

With such construction being employed, particulates in the exhaust gas 3 are captured by the particulate filter 5. The urea water is added intermediately of the mixing pipe 9B and downstream of the filter into the exhaust gas 3 by the injector 11 and is pyrolyzed into ammonia and carbon dioxide gas, so that $NO_x$ in the exhaust gas 3 is favorably reduced and depurated by the ammonia on the selective reduction catalyst 6. As a result, both the particulates and $NO_x$ in the exhaust gas 3 are lessened.

In this case, the exhaust gas 3 discharged through the exit end of the particulate filter 5 is reversely curved back by the communication passage 9 into the entry end of the adjacent selective reduction catalyst 6, so that a long distance is ensured between the urea water added position intermediately of the communication passage 9 and the selective reduction catalyst 6. The flow of the exhaust gas 3 becomes turbulent due to the reversed curving to facilitate mixing of the urea water with the exhaust gas 3, so that enough reaction time is ensured for production of ammonia from the urea water.

Moreover, the particulate filter 5 and selective reduction catalyst 6 are arranged in parallel with each other and the communication passage 9 is arranged between and along the particulate filter 5 and selective reduction catalyst 6, so that the whole structure becomes compact in size to substantially enhance its mountability on a vehicle.

As a prior art literature pertinent to the invention, there already exists, for example, the following Patent Literature 1.
[Patent Literature 1] JP 2005-155404A

SUMMARY OF INVENTION

Technical Problems

However, where the addition of the urea water to the selective reduction catalyst 6 is conducted between the particulate filter 5 and the catalyst 6 as illustrated in FIGS. 1 and 2 and mentioned in the above, the mixing pipe 9B is provided midway with a boss 10 branching slantingly upstream. Fitted from outside of the mixing pipe 9B into the boss 10 is a urea water addition injector 11. Urea water is added by the injector 11 protected so as not to be directly exposed to the flow of the hot exhaust gas 3 so that, when the exhaust gas 3 has increased flow rate as shown in FIG. 3, the urea water added by the injector 11 is forced by the vigorous flow of the exhaust gas 3 to be biased along an inner wall of the mixing pipe 9B, failing in sufficient dispersion of the urea water.

The invention was made in view of the above and has its object to provide an exhaust emission control device in which, even if exhaust gas has increased flow rate, urea water can be sufficiently dispersed with enhanced mixing with the exhaust gas.

Solution to Problems

The invention is directed to an exhaust emission control device comprising a particulate filter, a selective reduction catalyst arranged downstream thereof for selectively reacting $NO_x$ with ammonia even in the presence of oxygen, a communication passage for introduction of the exhaust gas from an exit side of the particulate filter to an entry side of the selective reduction catalyst and urea water addition means for adding urea water intermediately of said communication passage, characterized in that an upstream portion of said communication passage is constituted by a gas gathering chamber surrounding an exit end of the particulate filter to gather the exhaust gas from said exit end through substantially perpendicular turnabout and a mixing pipe for extracting the exhaust gas gathered in said gas gathering chamber through substantially perpendicular turnabout over again, a downstream end of the gas gathering chamber being connected to an entry end of mixing pipe to cover a periphery of the entry end of the mixing pipe with a required intervening space and to close the open entry end of the mixing pipe, the entry end of said mixing pipe being formed with a first opening at a position near the exit side of the particulate filter and being formed with a second opening at a position away from the exit side and diametrically opposite to said first opening, and that arranged in the downstream end of said gas gathering chamber are a first partition which guides all of the flow of the exhaust gas from the exit side of the particulate filter into one-way swirling flow around the entry end of the mixing pipe with its uppermost stream being at said first opening, a second partition which divides the flow of the exhaust gas guided by said first partition into two to cause an inner one of the divided swirling flows to tangentially enter into said first opening and a third partition which causes the remaining outer swirling flow to tangentially enter into said second opening.

Thus, in this manner, the exhaust gas from the exit end of the particulate filter is gathered in the gas gathering chamber through substantially perpendicular turnabout. In this respect, the flow swirling in one direction around the entry end of the mixing pipe by the first partition is guided, which brings about flow rectification of the exhaust gas in an early stage in cooperation with rectification by the second partition which divides the swirling flow into two. The inner one of the divided swirling flows by the second partition is guided tangentially into the first opening and the outer swirling flow is guided by the third partition tangentially into the second opening.

As a result, the rectified exhaust gas is caused to flow tangentially into the diametrically opposing first and second openings at the entry end of the mixing pipe and swirling flows are effectively formed in the mixing pipe by the exhaust gas flowing through the first and second openings, which facilitates dispersion of the urea water in the mixing pipe to remarkably enhance the mixing of the urea water with the exhaust gas. Moreover, the more a flow rate of the exhaust gas is increased, the more the formation of the swirling flows of the exhaust gas is facilitated; thus, the mixing of the urea water with the exhaust gas is kept enhanced even if the flow rate of the exhaust gas is increased.

When the exhaust gas discharged through the exit end of the particulate filter is gathered in the gas gathering chamber through substantially perpendicular turnabout, the exhaust gas is divided into two great flows or streams while being rectified, and is introduced at the two positions through the first and second openings. As a result, the flow of the exhaust gas is prevented beforehand from becoming turbulent and from being extremely throttled in flow cross-sectional area, so that the exhaust gas is smoothly guided from the exit end of the particulate filter to the entry end of the mixing pipe, which suppresses increase in exhaust resistance and lowers the pressure loss.

The urea water may be added upstream or downstream of a position where swirling flows of exhaust gas are formed. Wherever the urea water is added, dispersion of the urea water is facilitated by the swirling flows of the exhaust gas.

It is preferable in the invention that a space is provided between the entry end of the mixing pipe and the downstream end of the gas gathering chamber surrounding the periphery of the entry end of the mixing pipe and is scroll-shaped in accord with the flow of the exhaust gas guided around the entry end of said mixing pipe.

Thus, the one-way swirling flow around the entry end of the mixing pipe is further guided by the scroll-shape, which facilitates formation of the swirling flows of the exhaust gas introduced through the first and second openings into the mixing pipe, thereby further enhancing the mixing of the urea water with the exhaust gas in the mixing pipe.

Advantageous Effects of Invention

An exhaust emission control device of the invention mentioned above can have a variety of excellent effects and advantages as mentioned below.

(I) Swirling flows can be effectively formed in the mixing pipe to favorably disperse the urea water, so that the urea water can be favorably dispersed even if the flow rate of the exhaust gas is increased to thereby enhance the mixing with the exhaust gas. Before accession to the selective reduction catalyst, mist particles of the urea water can be effectively made smaller in size for early pyrolysis into ammonia and carbon dioxide gas.

(II) Without turbulence and extreme throttling in flow cross-area of the flow of the exhaust gas, the exhaust gas can be smoothly guided from the exit end of the particulate filter to the entry end of the mixing pipe, which suppresses increase in exhaust resistance and lowers the pressure loss.

(III) When the scroll-shape is provided in a space between the entry end of mixing pipe and the downstream end of the gas gathering chamber encircling the entry end of the mixing pipe in accord with the flow of the exhaust gas guided around the entry end of the mixing pipe, the flow of the exhaust gas can be guided by the scroll-shape to swirl in one direction around the entry end of the mixing pipe, so that swirling flow formation of the exhaust gas is further facilitated and the mixing of the urea water with the exhaust gas in the mixing pipe is further enhanced.

Figure 1:
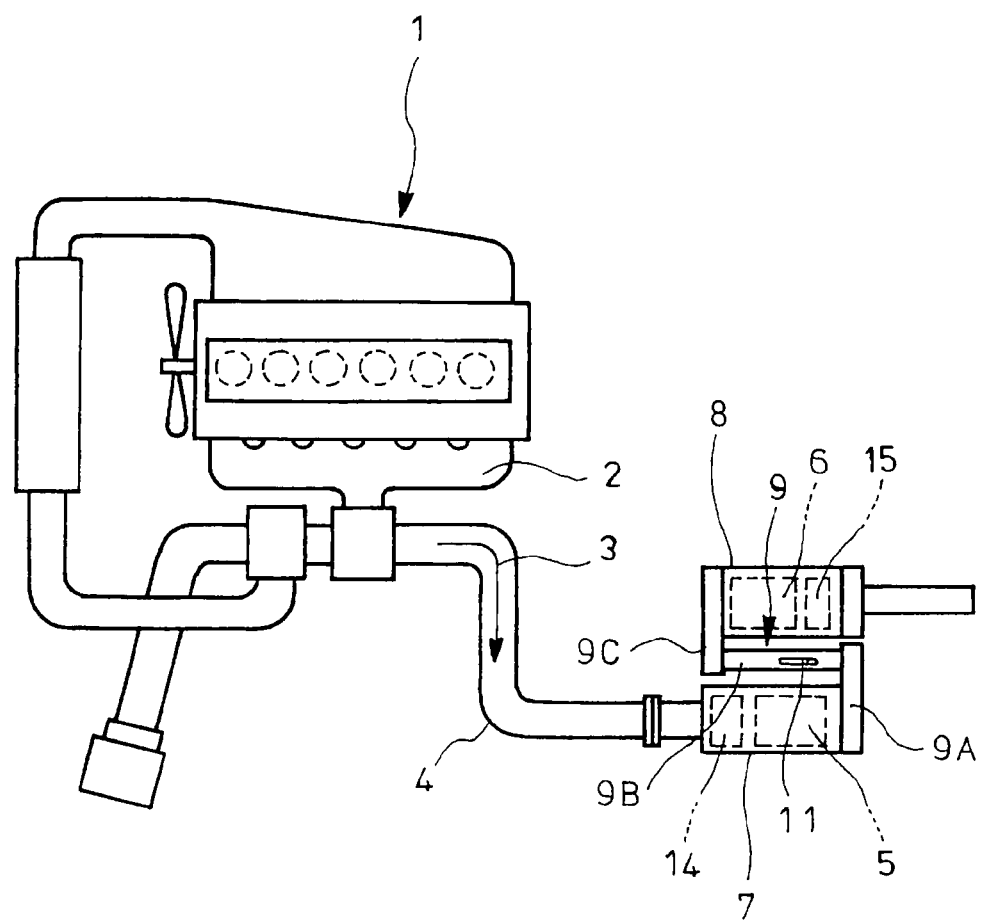
FIG. 1 is a schematic view showing a conventional device.

REFERENCE SIGNS LIST 3 exhaust gas
4 exhaust pipe
5 particulate filter
6 selective reduction catalyst
9 communication passage
9A gas gathering chamber
9a downstream end
9B mixing pipe
11 urea water addition injector (urea water addition means)
12 first opening
13 second opening
16 first partition
17 second partition
18 third partition

DESCRIPTION OF EMBODIMENT

An embodiment of the invention will be described in conjunction with the drawings.

Figure 2:
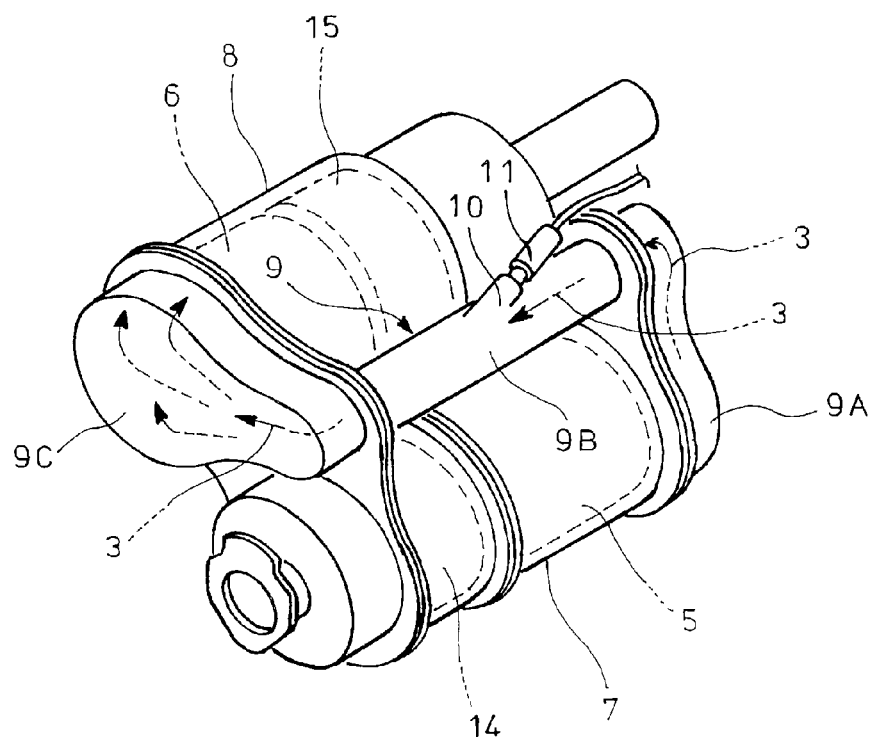
FIG. 2 is an enlarged perspective view showing important parts in FIG. 1.
Figure 3:
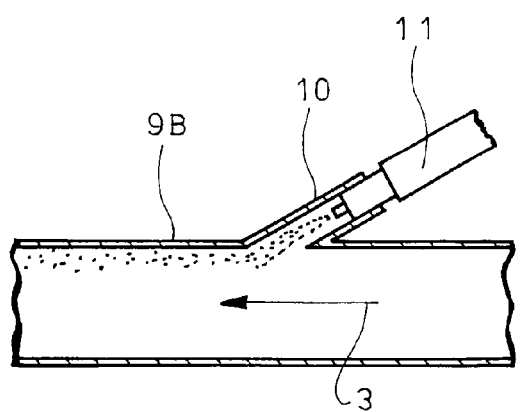
FIG. 3 is a sectional view for explanation of a problem in conventional urea water addition.
Figure 4:
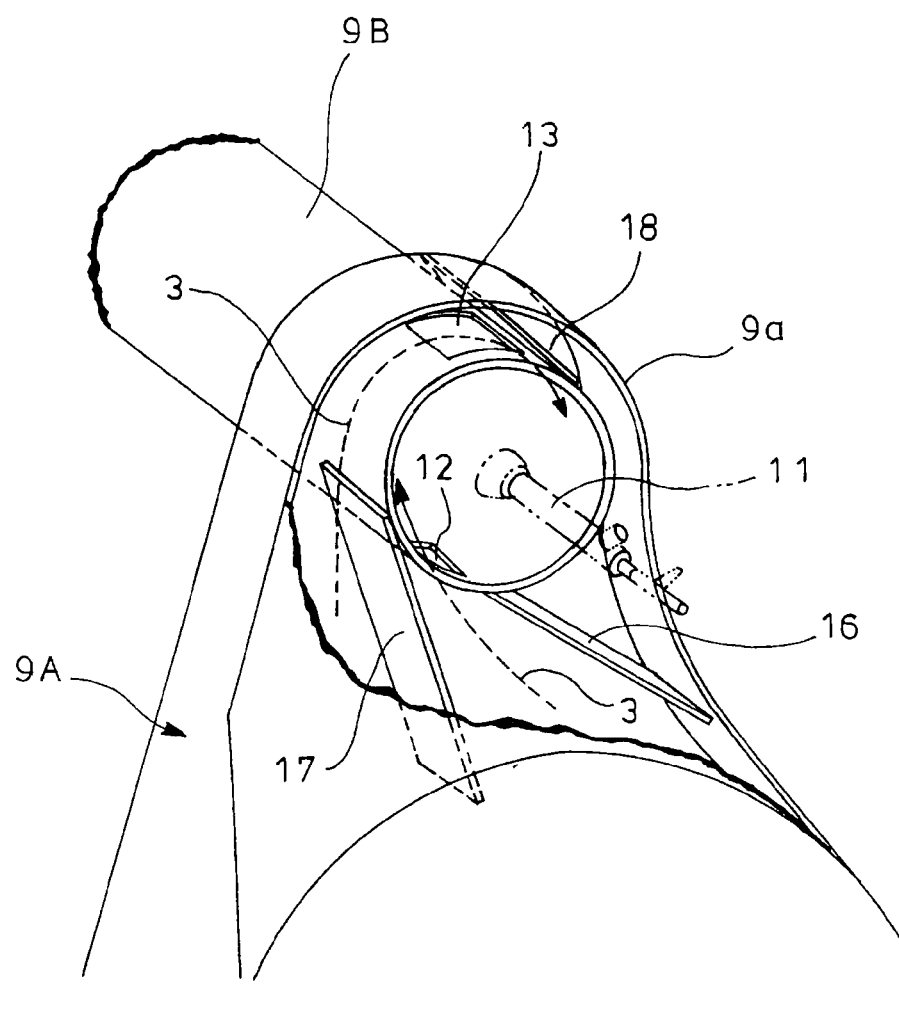
FIG. 4 is a partly cutout perspective view showing an embodiment of the invention.
Figure 5:
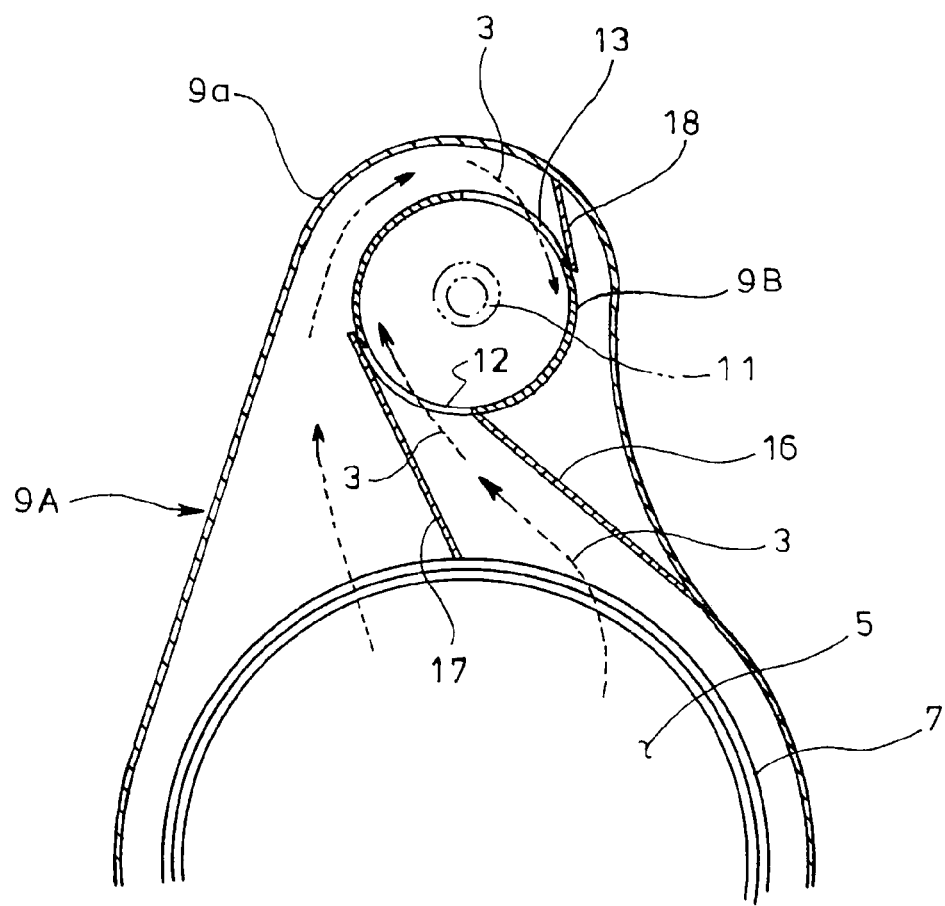
FIG. 5 is a sectional view of FIG. 4 looking in a direction opposite to an entry end of a mixing pipe.

FIGS. 4 and 5 show the embodiment of the invention which is directed to an exhaust emission control device constructed substantially similar to that shown in FIGS. 1 and 2 mentioned in the above, a gas gathering chamber 9A and a mixing pipe 9B constituting together an upstream portion of the communication passage 9 being changed as disclosed below.

Specifically, in the embodiment illustrated, a downstream end 9a of the gas gathering chamber 9A is connected to an entry end of the mixing pipe 9B to cover a periphery of the entry end of the mixing pipe 9B with a required intervening space and to close the open entry end of the mixing pipe 9B. Moreover, in the space between the entry end of the mixing pipe 9B and the downstream end 9a of the gas gathering chamber 9A encircling the entry end of the mixing pipe 9B, a scroll-shape is provided by a first partition 16, which is described hereinafter, in accord with the flow of the exhaust gas 3 guided so as to swirl in one direction around the entry end of the mixing pipe 9B (see arrow in dotted lines in FIG. 4).

The entry end of the mixing pipe 9B is formed with a first opening 12 at a position near the exit side of the particulate filer 5 (at a bottom of the mixing pipe 9B in the embodiment illustrated) and is formed with a second opening at a position away from the exit side of the particulate filer 5 (at a top of the mixing pipe 9B in the embodiment illustrated) and diametrically opposite to the first opening 12.

Arranged in the downstream end of the gas gathering chamber 9A are the first partition 16 which guides all of the flow of exhaust gas 3 from the exit side of the particulate filter 5 into a one-way swirling flow around the entry end of the mixing pipe 9B with its uppermost stream being at the first opening 12, a second partition 17 which divides the flow of the exhaust gas 3 guided by the first partition 16 into two to cause an inner one of the divided swirling flows to tangentially enter into the first opening 12 and a third partition 18 which causes the remaining outer swirling flow to tangentially enter into the second opening 13.

The open entry end of the mixing pipe 9B closed by the downstream end 9a of the gas gathering chamber 9A is coaxially fitted with a urea water addition injector 11 as urea water addition means which adds urea water centrally of the entry end of the mixing pipe 9B.

In such a construction, the exhaust gas 3 from the exit end of the particulate filter 5 is gathered in the gas gathering chamber 9A through substantially perpendicular turnabout. On this occasion, the one-way swirling flow around the entry end of the mixing pipe 9B is guided by the first partition 16, which brings about flow rectification of the exhaust gas 3 in an early stage in cooperation with rectification by the second partition 17 which divides the swirling flow into two.

The inner one of the divided swirling flows by the second partition 17 is guided tangentially into the first opening 12 and the outer swirling flow is guided by the third partition 18 tangentially into the second opening 13, so that the rectified exhaust gas 3 is caused to flow into the diametrically opposed first and second openings 12 and 13 as mutually inverted tangential flows at the entry end of the mixing pipe 9B.

As a result, the swirling flows are effectively formed in the mixing pipe 9B by the exhaust gas 3 flowing into the first and second openings 12 and 13, and the urea water is added by urea water addition injector 11 centrally of the entry end of the mixing pipe 9B where the swirling flows are most vigorous, so that the added urea water is favorably dispersed in the exhaust gas 3 by the swirling flows to thereby remarkably improve the mixing thereof with the exhaust gas 3.

The more a flow rate of the exhaust gas 3 is increased, the more the formation of the swirling flows of the exhaust gas 3 in the mixing pipe 9B is facilitated. As a result, the mixing of the urea water with the exhaust gas 3 is kept enhanced even if the flow rate of exhaust gas 3 is increased.

When the exhaust gas 3 discharged through the exit end of the particulate filter 5 is gathered in the gas gathering chamber 9A through substantially perpendicular turnabout, the exhaust gas 3 is divided into two great flows or streams while being rectified, and is introduced at the two positions through the first and second openings 12 and 13. As a result, the flow of the exhaust gas 3 is prevented beforehand from becoming turbulent and from being extremely throttled in flow cross-sectional area, so that the exhaust gas 3 is smoothly guided from the exit end of the particulate filter 5 to the entry end of the mixing pipe 9B, which suppresses increase in exhaust resistance and lowers pressure loss.

Thus, according to the above embodiment, the swirling flows can be favorably formed in the mixing pipe 9B for favorable dispersion of the urea water, so that the urea water can be favorably dispersed to enhance the mixing with the exhaust gas 3 even if the flow rate of exhaust gas 3 is increased. Before accession to the selective reduction catalyst 6 (see FIG. 2), mist particles of the urea water can be effectively made smaller in size for early pyrolysis into ammonia and carbon dioxide gas.

Without turbulence and extreme throttling in flow cross-sectional area of the flow of the exhaust gas 3, the exhaust gas 3 can be smoothly guided from the exit end of the particulate filter 5 to the entry end of the mixing pipe 9B, which suppresses increase in exhaust resistance and lowers the pressure loss.

Especially in the embodiment illustrated, the space is provided between the entry end of mixing pipe 9B and the downstream end of the gas gathering chamber 9A encircling the entry end of the mixing pipe 9B, and the scroll-shape is provided in the space in accord with the flow of the exhaust gas 3 guided around the entry end of the mixing pipe 9B, so that the flow of the exhaust gas 3 swirling in the one direction around the entry end of the mixing pipe 9B is guided by the scroll-shape, which can further facilitate formation of the swirling flows of the exhaust gas 3 and can further enhance the mixing the urea water with the exhaust gas 3 in the mixing pipe 9B.

It is to be understood that an exhaust emission control device of the invention is not limited to the above embodiment and that various changes and modifications may be made without departing from the scope of the invention. For example, the urea water added position is not limited to that shown in the illustrated embodiment. Though illustrated in the embodiment is a case where the exhaust gas gathered in the gas gathering chamber is extracted by the mixing pipe in a direction reverse to the flow of the exhaust through the particulate filter, the invention may be similarly applicable to a construction where the exhaust gas gathered in the gas gathering chamber is extracted by the mixing pipe in a direction of the flow of the exhaust through the particulate filter.

The invention claimed is:

1. An exhaust emission control device comprising a particulate filter, a selective reduction catalyst arranged downstream thereof for selectively reacting $NO_x$ with ammonia even in the presence of oxygen, a communication passage for introduction of the exhaust gas from an exit side of the particulate filter to an entry side of the selective reduction catalyst and urea water addition means for adding urea water intermediately of said communication passage, characterized in that an upstream portion of said communication passage is constituted by a gas gathering chamber surrounding an exit end of the particulate filter to gather the exhaust gas from said exit end through substantially perpendicular turnabout and a mixing pipe for extracting the exhaust gas gathered in said gas gathering chamber through substantially perpendicular turnabout over again, a downstream end of the gas gathering chamber being connected to an entry end of mixing pipe to cover a periphery of the entry end of the mixing pipe with a required intervening space and to close the open entry end of the mixing pipe, the entry end of said mixing pipe being formed with a first opening at a position near the exit side of the particulate filter and being formed with a second opening at a position away from the exit side and diametrically opposite to said first opening, and that arranged in the downstream end of said gas gathering chamber are a first partition which guides all of the flow of the exhaust gas from the exit side of the particulate filter into one-way swirling flow around the entry end of the mixing pipe with its uppermost stream being at said first opening, a second partition which divides the flow of the exhaust gas guided by said first partition into two to cause an inner one of the divided swirling flows to tangentially enter into said first opening and a third partition which causes the remaining outer swirling flow to tangentially enter into said second opening.

2. An exhaust emission control device as claimed in claim 1, wherein a scroll-shape is provided in the space between the entry end of the mixing pipe and the downstream end of the gas gathering chamber surrounding the entry end of said mixing pipe, in accord with the flow of the exhaust gas guided around the entry end of said mixing pipe.

* * * * *